(12) United States Patent
Kim

(10) Patent No.: US 10,880,049 B2
(45) Date of Patent: Dec. 29, 2020

(54) METHOD AND APPARATUS FOR MULTI-STTI-BASED SCHEDULING FOR TRANSMITTING AND RECEIVING DATA CHANNEL IN LTE

(71) Applicant: KT CORPORATION, Gyeonggi-do (KR)

(72) Inventor: Ki-tae Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/197,487

(22) Filed: Nov. 21, 2018

(65) Prior Publication Data

US 2019/0165895 A1 May 30, 2019

(30) Foreign Application Priority Data

Nov. 24, 2017 (KR) ........................ 10-2017-0158686
Sep. 7, 2018 (KR) ........................ 10-2018-0107317

(51) Int. Cl.
*H04L 1/08* (2006.01)
*H04L 1/18* (2006.01)
(Continued)

(52) U.S. Cl.
CPC .......... *H04L 1/1816* (2013.01); *H04L 5/0053* (2013.01); *H04W 28/18* (2013.01); *H04W 72/0413* (2013.01); *H04L 5/0091* (2013.01)

(58) Field of Classification Search
CPC ... H04L 1/1816; H04L 5/0053; H04L 5/0091; H04L 1/08; H04L 1/1819; H04W 72/0413; H04W 28/18
See application file for complete search history.

(56) References Cited

U.S. PATENT DOCUMENTS

2015/0222407 A1\* 8/2015 Nammi ................ H04B 7/0413
370/336
2017/0048905 A1\* 2/2017 Yun ........................ H04L 5/0053
(Continued)

FOREIGN PATENT DOCUMENTS

WO 2016/153025 A1 9/2016

OTHER PUBLICATIONS

Nokia et al., "Discussion on scheduling based URLLC transmission", R1-1714022, 3GPP TSG-RAN WG1 #90, Prague, Czech Republic, Aug. 21-25, 2017.
(Continued)

*Primary Examiner* — Edan Orgad
*Assistant Examiner* — Malick A Sohrab
(74) *Attorney, Agent, or Firm* — IP Legal Services, LLC

(57) ABSTRACT

Provided is a method of scheduling for improving the performance of data channel detection in order to provide URLLC services in the 3GPP LTE/LTE-A system. In particular, a method of a UE may be provided for transmitting an uplink data channel or receiving a downlink data channel. The method may include receiving repetitive transmission information for the uplink data channel or the downlink data channel from a base station, and receiving the downlink data channel from the base station or transmitting the uplink data channel to the base station, based on the repetitive transmission information. The repetitive transmission information indicates a number of repetitive transmissions for the uplink data channel or the downlink data channel, and the repetitive transmission is performed based on on a unit of a slot or a unit of a sub-slot.

12 Claims, 21 Drawing Sheets

(51) Int. Cl.
*H04W 28/18* (2009.01)
*H04L 5/00* (2006.01)
*H04W 72/04* (2009.01)

(56) References Cited

U.S. PATENT DOCUMENTS

| | | | |
|---|---|---|---|
| 2017/0359808 A1* | 12/2017 | Dinan | H04W 72/0446 |
| 2018/0070403 A1* | 3/2018 | Uemura | H04W 4/70 |
| 2018/0109358 A1* | 4/2018 | Xing | H04L 1/1819 |
| 2018/0219649 A1* | 8/2018 | Ying | H04L 1/1816 |
| 2019/0223209 A1* | 7/2019 | Li | H04L 5/0053 |
| 2019/0229856 A1* | 7/2019 | Sano | H04L 1/1861 |
| 2020/0059821 A1* | 2/2020 | Wirth | H04L 5/0094 |

OTHER PUBLICATIONS

Qualcomm Incorporated, "Summary DL/UL Scheduling and HARQ Management", R1-1716865, 3GPP TSG- RAN WG1 RAN1 NR AdHoc #3, Sep. 18-21, 2017, Nagoya, Japan, pp. 1-10.
NEC, "Remaining issues on UL transmission without grant", R1-1720382, 3GPP TSG RAN WG1 Meeting #91, Reno, Nevada, US, Nov. 27-Dec. 1, 2017, pp. 1-5.
NTT Docomo, Inc., "Email discussions on UL transmission procedures", R1-1718814, 3GPP TSG RAN WG1 Meeting 90bis, Prague, CZ, Oct. 9-13, 2017, pp. 1-34.

* cited by examiner

FIG.21

| ... | repetition number | .... |
|---|---|---|

DL control information

METHOD AND APPARATUS FOR MULTI-STTI-BASED SCHEDULING FOR TRANSMITTING AND RECEIVING DATA CHANNEL IN LTE

CROSS-REFERENCE TO RELATED APPLICATION

This application claims the priority benefit of Korean Patent Application Nos. 10-2017-0158686, filed on Nov. 24, 2017 and No. 10-2018-0107317, filed on Sep. 7, 2018 in the Korean Intellectual Property Office, the disclosures of which are incorporated herein by reference in their entirety.

BACKGROUND OF THE INVENTION

1. Field of the Invention

The present disclosure relates to a scheduling method of improving the performance of data channel detection to provide an ultra-reliable and low latency communication service (URLLC) for long term evolution (LTE) in the 3rd generation partnership project (3GPP) long term evolution (LTE)/LTE-A system.

2. Description of the Prior Art

Studies and discussions have been in progress for reducing latency in the 3GPP LTE/LTE-Advanced system. The main purpose of such studies and discussions for latency reduction is to standardize the operation of a short Transmission Time Interval (hereinafter referred to as "short TTI" or "sTTI") to improve the throughput of the transmission control protocol (TCP).

In the typical LTE/LTE-Advanced system, a typical TTI frame structure is configured with 14 to 12 OFDM symbols (e.g., TTI=1 ms=14/12 OFDM symbols). Unlike the typical TTI frame structure, the short TTI (sTTI) frame structure is configured in 2, 3, or 7 symbols. The latency and data throughput of the LTE/LTE-Advanced system may be reduced and improved by transmitting and receiving data based on the sTTI frame structure.

To this end, there are many discussions and studies in progress for advancing the short TTI, such as the feasibility of a TTI length between 0.5 ms and a single OFDM symbol, the performance thereof, the preserving of backward compatibility, and the like.

As an additional method for reducing the latency and improving reliability in the 3GPP LTE/LTE-Advanced system, the URLLC for LTE has been studied and discussed. In particular, there is a need for defining a data channel transmission/reception technique capable of improving reliability in the URLLC for LTE.

SUMMARY OF THE INVENTION

An object of the present disclosure is to provide a method of transmitting and receiving a data channel between a device (e.g., user equipment or "UE") and a base station, which satisfy an improved reliability requirement of the URLLC for LTE. In particular, in accordance with some embodiments of the present disclosure, provided is a multi-TTI-based scheduling method capable of satisfying the BLER (Block Error Rate)=$10^{-5}$ performance, which is a transmission and reception performance requirement of a data channel in the URLLC for LTE.

In accordance with an aspect of the present disclosure, a method of a UE may be provided for transmitting an uplink data channel or receiving a downlink data channel. The method may include receiving repetitive transmission information for the uplink data channel or the downlink data channel from a base station, and receiving the downlink data channel from the base station or transmitting the uplink data channel to the base station based on the repetitive transmission.information. The repetitive transmission.information indicates the number of repetitive transmissions for the uplink data channel or the downlink data channel, and the repetitive transmission is performed based on a unit of a slot or a unit of a sub-slot.

In accordance with another aspect of the present disclosure, a method of a base station may be provided for receiving an uplink data channel or transmitting a downlink data channel is provided. The method may include transmitting repetitive transmission.information for the uplink data channel or the downlink data channel to a UE, and receiving the uplink data channel from the UE or transmitting the downlink data channel to the UE based on the repetitive transmission information. The repetitive transmission information indicates information on the number of repetitive transmissions for the uplink data channel or the downlink data channel, and the repetitive transmission is performed based on a unit of a slot or a unit of a sub-slot.

In accordance with another aspect of the present disclosure, a UE may be provided for transmitting an uplink data channel or receiving a downlink data channel. The UE may include a receiver configured to receive repetitive transmission information for the uplink data channel or the downlink data channel from a base station, and receive the downlink data channel from the base station based on the repetitive transmission information, and a transmitter configured to transmit the uplink data channel to the base station based on the repetitive transmission information. The repetitive transmission information indicates a number of repetitive transmissions for the uplink data channel or the downlink data channel, and the repetitive transmission is performed on a based on a slot or a based on a sub-slot.

In accordance with another aspect of the present disclosure, a base station may be provided for receiving an uplink data channel or transmitting a downlink data channel. The base station may include a transmitter configured to transmit repetitive transmission information for the uplink data channel or the downlink data channel to a UE, and transmit the downlink data channel to the UE on the repetitive transmission information, and a receiver configured to receive the uplink data channel from the UE based on the repetitive transmission information. The repetitive transmission information indicates the number of repetitive transmissions for the uplink data channel or the downlink data channel, and the repetitive transmission is performed based on a unit of a slot or a unit of a sub-slot.

In accordance with some embodiments of the present disclosure, provided is a method of transmitting and receiving a data channel between a UE and a base station, which satisfy an improved reliability requirement in the URLLC for LTE.

BRIEF DESCRIPTION OF THE DRAWINGS

FIG. 21 is a diagram illustrating a downlink control information including information indicating repetitive transmission, according to at least one embodiment of the present disclosure.

DETAILED DESCRIPTION OF THE EXEMPLARY EMBODIMENTS

Figure 1:
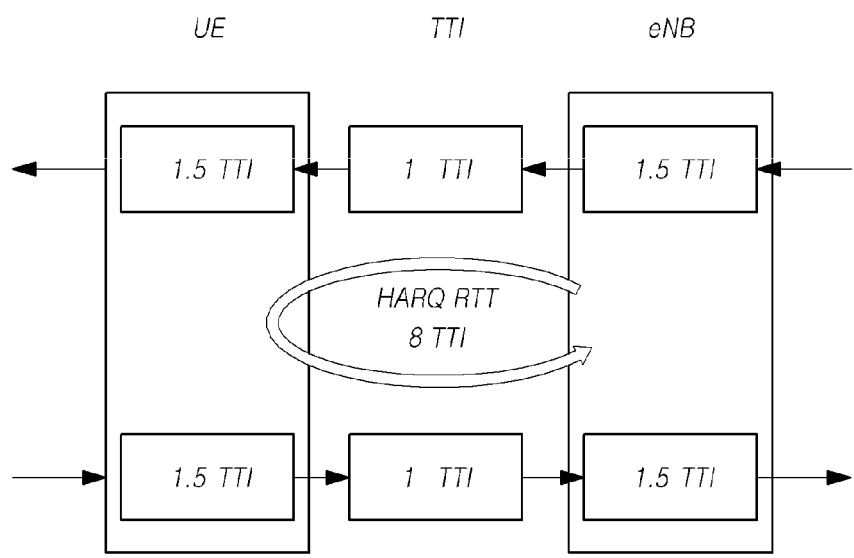
FIG. 1 is a diagram illustrating processing delays and hybrid automatic repeat request (HARQ) RTT (Round Trip Time) in a base station and a user equipment (UE), according to at least one embodiment of the present disclosure.

Hereinafter, the present preferred embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

In the present disclosure, a wireless communication system\ refers to a system for providing various communication services such as a voice communication service, a packet data service, etc. The wireless communication system includes a user equipment (UE) and a base station (BS).

The UE is a generic term referring to devices used in wireless communication. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like. The BS or a cell generally refers to a station communicating with the UE. The BS or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the various cells is controlled by a BS. Therefore the BS may be classified into two categories. 1) The BS may be referred to an apparatus that forms and provides a corresponding communication service area, such as a megacell, a macrocell, a microcell, a picocell, a femtocell, and a small cell or 2) the BS may be referred to a communication service area. In case of 1), the BS may be referred to i) apparatuses that form and provide area corresponding communication service area and are controlled by the same entity or ii) apparatus that interact and cooperate with each other for forming and providing the corresponding communication service area. According to communication schemes employed by a BS, the BS may be referred to as a point, a transmission/reception point, a transmission point, a reception point, or the like. In case of 2), the BS may be a communication service area itself where UEs able to receive signals from or transmit signals to other UEs and neighboring BSs.

In the present disclosure, the cell may also refer to a coverage of a signal transmitted from a transmission/reception point, a component carrier having the coverage of a signal transmitted from a transmission point or a transmission/reception point, or a transmission/reception point itself.

The UE and the BS are two entities for performing transmission/reception used to embody the technology and technical spirit described in the present specification. The UE and the BS are a generic term and not limited to specific terms or words.

Herein, the uplink (UL) refers to data transmitting/receiving by a UE to/from a BS, and the downlink (DL) refers to data transmitting/receiving by a BS to/from a UE.

UL transmission and DL transmission may be performed based on i) a time division duplex (TDD) technique performing transmission through different time slots, ii) a frequency division duplex (FDD) technique performing transmission through different frequencies, or iii) a hybrid technique of the frequency division duplex (FDD) and the time division duplex (TDD).

Further, the related standard of the wireless communication system defines configuring the UL and the DL based on a single carrier or a pair of carriers.

The UL and the DL transmit control information through control channels, such as a physical DL control channel (PDCCH), a physical UL control channel (PUCCH), and the like. The UL and DL transmit data through data channels, such as a physical DL shared channel (PDSCH), a physical UL shared channel (PUSCH), and the like.

The DL may denote communication or a communication path from multiple transmission/reception points to a UE, or the UL may denote communication or a communication path from the UE to the multiple transmission/reception points. In the DL, a transmitter may be a part of multiple transmission/reception points, and a receiver may be a part of the UE. In the UL, a transmitter may be a part of the UE and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling includes radio resource control (RRC) signaling transmitting RRC information containing an RRC parameter.

The BS performs DL transmission to the device. The BS may transmit a physical DL control channel for transmitting i) DL control information, such as scheduling required to receive a DL data channel that is a primary physical channel for unicast transmission, and ii) scheduling approval information for transmission through an UL data channel. Hereinafter, transmission/reception of a signal through each channel may be described as transmission/reception of the corresponding channel.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments according to the present disclosure may be apply to resource allocation in i) asynchronous wireless communication evolving into LTE/LTE-advanced and IMT-2020 from GSM, WCDMA, and HSPA, ii) synchronous wireless communication evolving into CDMA, CDMA-2000, and UMB.

In the present disclosure, a machine type communication (MTC) device may refer to a device that is low cost (or low complexity), a device that supports coverage enhancement, or the like. As another example, the MTC device may refer to a device defined as a predetermined category for supporting low costs (or low complexity) and/or coverage enhancement.

In other words, the MTC device may refer to a low cost (or low complexity) user equipment (UE) category/type newly defined in 3GPP Release-13 and performing LTE-based MTC-related operations. The MTC device may refer to a UE category/type defined in or before 3GPP Release-12, which supports enhanced coverage in comparison with the typical LTE coverage or supports low power consumption. Or, the MTC device may refer to a low cost (or low complexity) UE category/type newly defined in Release-13. The MTC device may refer to a further enhanced MTC device defined in Release-14.

In the present disclosure, a narrowband Internet of Things (NB-IoT) device refers to a device supporting radio access for cellular IoT. NB-IoT technology is aimed at indoor coverage improvement, support for large-scale low-speed devices, low latency sensitivity, very low device costs, low power consumption, and optimized network architecture.

An enhanced mobile broadband (eMBB), massive machine-type communication (mMTC), and ultra reliable and low latency communication (URLLC) are proposed as representative usage scenarios for NR having been discussed in the 3GPP recently.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

Latency Reduction

Many discussions and studies have been conducted for reducing latency in a wireless communication system. The main purpose of the latency reduction is to standardize the operation of a short transmission time interval (hereinafter referred to as "short TTI" or "sTTI") in order to improve the throughput of the TCP.

Potential impacts and studies have been in progress within the following ranges.

Assess specification impact and study feasibility and performance of TTI lengths between 0.5 ms and one OFDM symbol, taking into account impact on reference signals and physical layer control signaling.

Backwards compatibility shall be preserved (thus allowing normal operation of pre-Rel 13 UEs on the same carrier).

Latency reduction can be achieved by the following physical layer techniques.

short TTI reduced processing time in implementation new frame structure of TDD

Discussions further have been in progress for reducing latency as follows.

Following design assumptions are considered:

No shortened TTI spans over subframe boundary

At least for SIBs and paging, PDCCH and legacy PDSCH are used for scheduling

The potential specific impacts for the followings are studied

UE is expected to receive a sPDSCH at least for DL unicast sPDSCH refers PDSCH carrying data in a short TTI UE is expected to receive PDSCH for DL unicast whether a UE is expected to receive both sPDSCH and PDSCH for DL unicast simultaneously The number of supported short TTIs
Following design assumptions are used for the study
From eNB perspective, existing non-sTTI and sTTI can be FDMed in the same subframe in the same carrier
Other multiplexing method(s) with existing non-sTTI for UE supporting latency reduction features
In this study, following aspects are assumed in RAN1
PSS/SSS, PBCH, PCFICH and PRACH, Random access, SIB and Paging procedures are not modified
Following aspects are further studied in the next RAN1 meeting
Note: But the study is not limited to them.
Design of sPUSCH DM-RS
Alt. 1: DM-RS symbol shared by multiple short-TTIs within the same subframe
Alt. 2: DM-RS contained in each sPUSCH
HARQ for sPUSCH
Whether/how to realize asynchronous and/or synchronous HARQ
sTTI operation for Pcell and/or SCells by (e)CA in addition to non-(e)CA case FIG. 1 is a diagram illustrating processing delays and HARQ RTT (hybrid automatic repeat request Round Trip Time) in a BS and a UE, according to at least one embodiment of the present disclosure.

Basically, in the average down-link latency calculation, latency may be calculated according to the following procedures.

Following the same approach as in section B.2.1 in 3GPP TR 36.912, the LTE U-plane one-way latency for a scheduled UE is comprised of the fixed node processing delays and 1 TTI duration for transmission, as shown in FIG. 1 below. Assuming the processing times can be scaled by the same factor of TTI reduction keeping the same number of HARQ processes, the one way latency can be calculated as follows.

$$D=1.5 TTI(\text{eNB processing and scheduling})+1\ TTI\\(\text{transmission})+1.5\ TTI(\text{UE processing})+n*8\\TTI(\text{HARQ retransmissions})=(4+n*8)TTI.$$

Considering a typical case where there would be 0 or 1 retransmission, and assuming error probability of the first transmission to be p, the delay is given by $$D=(4+p*8)TTI.$$

So, for 0% BLER (Block Error Rate), D=4*TTI, and for 10% BLER, D=4.8*TTI.

Average UE Initiated UL Transmission Latency Calculation

Assume UE is in connected/synchronized mode and wants to do UL transmission, e.g., to send TCP ACK. Following table shows the steps and their corresponding contribution to the UL transmission latency. To be consistent in comparison of DL and UL, we add the eNB processing delay in the UL after the UL data is received by the eNB (step 7).

TABLE 1

| Step | Description | Delay |
|---|---|---|
| 1. | Average delay to next SR opportunity | SR periodicity/2 |
| 2. | UE sends SR | 1 TTI |
| 3. | eNB decodes SR and generates scheduling grant | 3 TTI |
| 4. | Transmission of scheduling grant (assumed always error free) | 1 TTI |
| 5. | UE processing delay (decoding Scheduling grant + L1 encoding of data) | 3 TTI |

TABLE 1-continued

| Step | Description | Delay |
|---|---|---|
| 6. | UE sends UL transmission | (1 + p * 8) TTI where p is initial BLER. |
| 7. | eNB receives and decodes the UL data | 1.5 TTI |

In the table above, steps 1-4 and half delay of step 5 is assumed to be due to SR, and rest is assumed for UL data transmission in values shown in Table 4.

Resource Mapping of Short TTI

Figure 2:
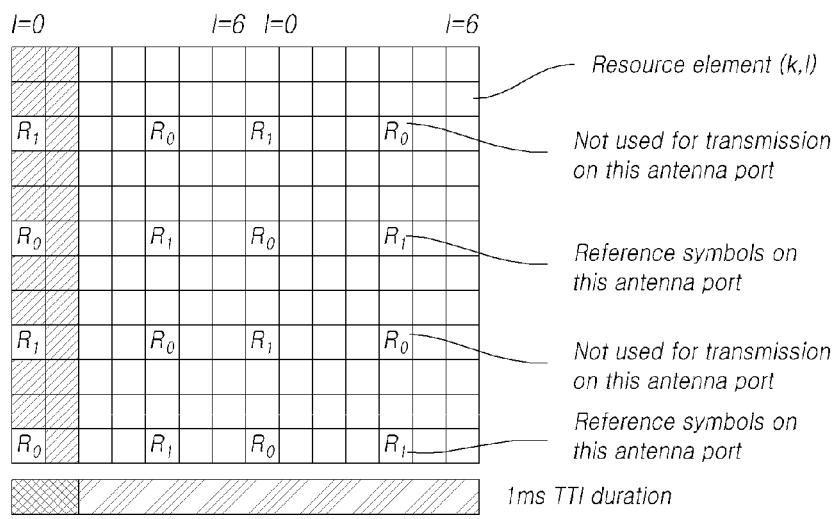
FIG. 2 is a diagram illustrating resource mapping for each physical resource block (PRB) in a single subframe, according to at least one embodiment of the present disclosure.
Figure 2:
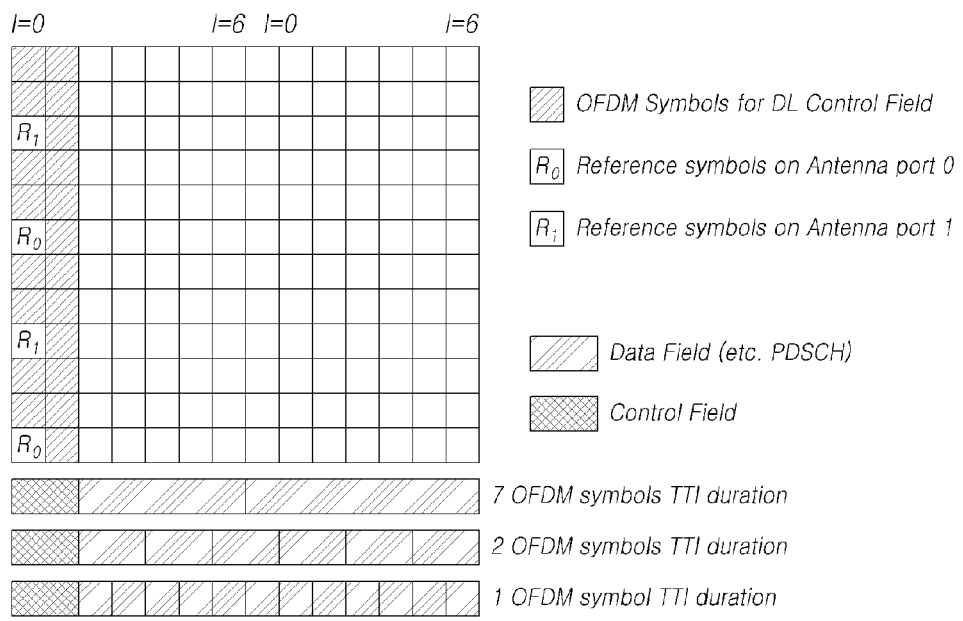
Figure 3:
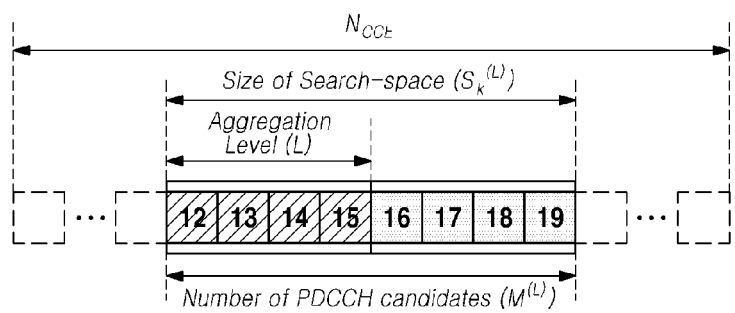
FIG. 3 is a conceptual diagram illustrating the definition of search space, according to at least one embodiment of the present disclosure.
Figure 4:
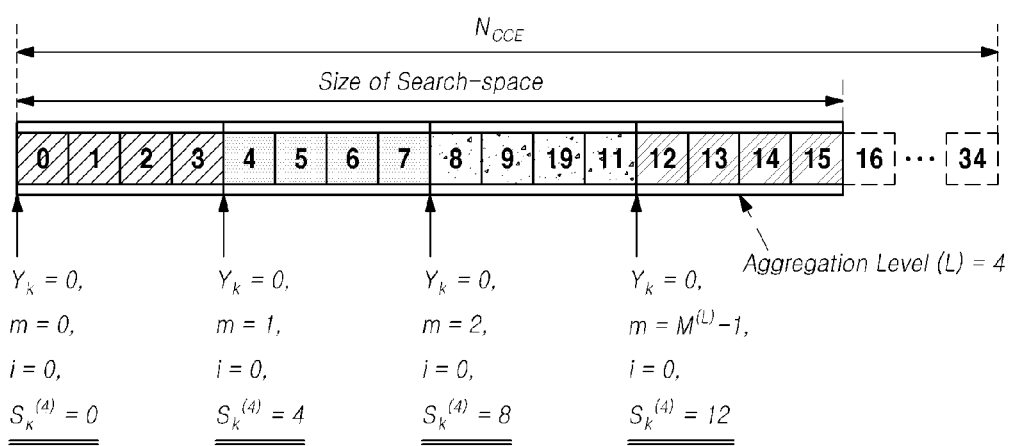
FIG. 4 is a conceptual diagram illustrating the definition of common search space, according to at least one embodiment of the present disclosure.
Figure 5:
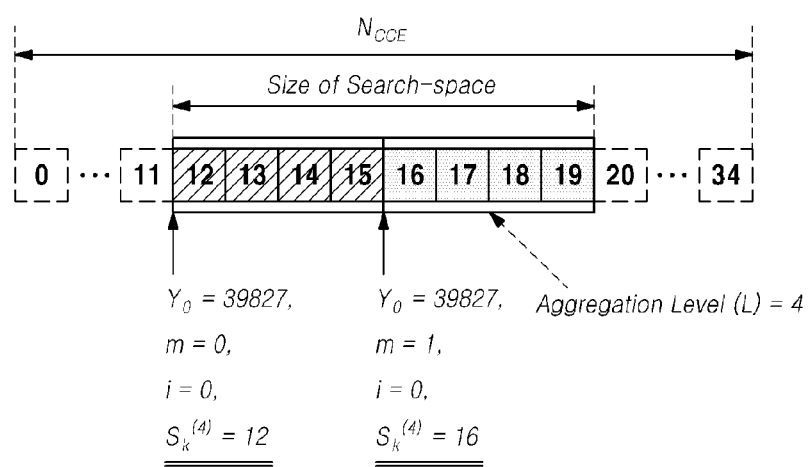
FIG. 5 is a conceptual diagram illustrating the definition of UE-specific search space, according to at least one embodiment of the present disclosure.

In FIG. 2, the resource map above is the legacy resource mapping per PRB in one subframe, considering 2 Antenna ports and 2 OFDM symbols control field. In FIG. 2, the resource map below is the short TTI resource mapping, considering 2 OFDM symbols used for the control field in order to ensure the backward compatibility. The loss rates ($L_{legacy}$, e.g. 5%-50%) of the PHY layer in short TTI duration are assumed.

TBS Calculation of Short TTI

According to the resource mapping and the TBS calculation formula given above, the loss rate of PHY layer for legacy PDSCH is calculated as follows:

$$L_{legacy} = \frac{\text{the number of reference symbols within PDSCH}}{\text{the number of REs within PDSCH}} = \frac{12}{144} = 8.3\% \quad \text{[Equation 1]}$$

For different short TTI duration, The TBS of short TTI PDSCH is calculated as the following table:

TABLE 2

| TTI Duration | TBS of short TTI PDSCH ($TBS_{short}$) |
|---|---|
| 7 OFDM symbol | First time slot:<br>$TBS_{short} = TBS_{legacy} \times \frac{60}{144} \times \frac{1-L_{short}}{8.3\%}$<br><br>Second time slot:<br>$TBS_{short} = TBS_{legacy} \times \frac{84}{144} \times \frac{1-L_{short}}{8.3\%}$ |
| 2 OFDM symbol | $TBS_{short} = TBS_{legacy} \times \frac{24}{144} \times \frac{1-L_{short}}{8.3\%}$ |
| 1 OFDM symbol | $TBS_{short} = TBS_{legacy} \times \frac{12}{144} \times \frac{1-L_{short}}{8.3\%}$ |

Existing PDCCH Detection

Basically, to detect a PDCCH, blind decoding based on a given hashing function is performed based on an aggregation level and a PDCCH candidate, which are described below.

$$S_k^{(L)} = L \cdot \{(Y_k + m) \bmod \lfloor N_{CCE,k} / L \rfloor\} + i \quad \text{[Equation 2]}$$

$$\begin{cases} L \in \{1, 2, 4, 8\} \\ i = 0, \ldots, L-1 \\ m = 0, \ldots M^{(L)} - 1 \end{cases}$$

TABLE 3

Search space의 aggregation level (TS 36.213)

| Type | Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Here, the definition of a search space using a hashing function and a procedure for performing blind decoding are as follows.

1) Defining of Search Space
Search space
The variable $Y_k$
For the COMMON search space $$Y_k = 0, L \in \{4, 8\}$$

For the UE-specific search space $$Y_k = (A \cdot Y_{k-1}) \bmod D$$

$$\begin{cases} L \in \{1, 2, 4, 8\} \\ Y_{-1} = n_{RNTI} \neq 0 \\ A = 39827, D = 65537 \\ k = \lfloor n_s/2 \rfloor \rightarrow \text{Subframe index(from 0 to 9)} \\ n_s = 0, \ldots, 19 \rightarrow \text{Slot number(from 0 to 19)} \end{cases}$$

Size of search space
CCE units
The size depends on the type and aggregation level of search space
4 kinds of size: 6, 8, 12, 16 [CCEs]
Number of PDCCH candidates $M^{(L)}$
The set of PDCCH candidates to monitor are defined in terms of search spaces
Mainly connected to the aggregation level $$M^{(L)} = S_k^{(L)}/L$$

2) Relationship between $Y_k$ and search space
Offset of starting-point of search space
Offset ($Y_k$) has UE-specific value within UE-specific search space
Offset ($Y_k$) is fixed by zero in common search space
Example: Common Search Space
　Aggregation level) (L): 4, $N_{CCE}$=35
　Size of Search space): 16 CCEs
　Number of candidate ($M^{(L)}$): 4
　$Y_k = 0$ ($Y_k$ does not get affected by $n_{RNTI}$)

$$S_k^{(4)} = L \cdot \{(Y_k + m) \bmod \lfloor N_{CCE,k}/L \rfloor\} + i = 4 \cdot \{(0+m) \bmod 8\} + i$$

Example: UE-specific Search Space
　Aggregation level (L): 4, $N_{CCE}$=35
　Size of Search space: 8 CCEs
　Number of candidate ($M^{(L)}$): 2

$$Y_k = (A \cdot Y_{k-1}) \bmod D \rightarrow Y_0 =$$

$$(A \cdot Y_{-1}) \bmod D = 39827 \begin{cases} k - \lfloor n_s/2 \rfloor = \lfloor 0/2 \rfloor = 0 \\ n_{RNTI} = 0001(hex) \\ n_s = 0 \end{cases}$$

$$S_k^{(L)} = L \cdot \{(Y_k + m) \bmod \lfloor N_{CCE,k}/L \rfloor\} + i \rightarrow$$

$$S_0^{(4)} = 4 \cdot \{(Y_0 + m) \bmod \lfloor N_{CCE,0}/L \rfloor\} + i = 4 \cdot \{(39827 + m) \bmod 8\} + i$$

$$= 4 \cdot \{(3 + m) \bmod 8\} + i$$

In the end, based on the defined search space, the maximum number of blind decoding for the UE to find its PDCCH is determined as shown in Table 4 below.

As shown in Table 4, for the aggregation levels 1, 2, 4, and 8, the total number of PDCCH candidates for UE-specific (UESS) is 16 (UESS=16), and the total number of PDCCH candidates for common (CSS) is 6 (CSS=6). Accordingly, the number of formats of the PDCCH to be searched in each transmission mode is 2 (e.g., DCI format 1A+α'). Therefore, the total number of blind decoding is 44 (based on the legacy PDCCH).

TABLE 4

| Type | Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |
| Max number of BDs | | | 22 × 2 = 44 BDs |

URLLC Support for LTE

The main purpose of Ultra reliable and low latency communication for LTE (URLLC for LTE) is to introduce a URLLC service that improves reliability along with latency reduction into LTE. Discussions and studies have been in progress for potential impacts related to RAN1 within the scope described below.

The URLLC for LTE may be referred to as LTE URLLC, HRLLC, and etc., but not limited thereto.

Phase 1

Identify improved communication reliability and different latency constraints combinations for both wide and local area deployments.

Consider the ITU IMT-2020 and the 3GPP TR 38.913 requirements on URLLC and the ability to enable the network to operation with a range of reliability targets and latency constraints.

Identify any potential new evaluations scenarios.

Lately, discussions have been in progress for scenarios and target goals for new standard items for the URLLC for LTE. Specifically, discussions have been in progress for developing methods for improving the performance of data channel transmission or reception in the URLLC for LTE.

The transmission or reception of the data channel denotes that a UE transmits an UL data channel to a BS or the BS transmits a DL data channel to the UE.

In a frame structure of a short transmission time interval (hereinafter referred to as "short TTI" or "sTTI"), the DL data channel may be a DL data channel (sPDSCH) of the short transmission time interval. In the frame structure of the short transmission time interval, the UL data channel may be an UL data channel (sPUSCH) of the short transmission time interval.

In at least one embodiment described below, a method of transmitting or receiving a data channel capable of satisfying an improved reliability requirement in the URLLC for LTE will be described. In particular, a multi-TTI scheduling technique to satisfy BLER=$10^{-5}$ performance, which is a required performance for a data channel, will be described.

Basically, the LTE URLLC is designed to satisfy a latency requirement and to improve performance by reusing a typical sTTI structure. Accordingly, it is expected to improve the reliability of data channel transmission or reception improved through multi-sTTI scheduling by combining with a redundancy version (RV) at the time of the transmission of such an sTTI.

In at least one embodiment described below, a multi-TTI-based scheduling technique will be described when transmitting or receiving a data channel in the URLLC for LTE. First, in the URLLC for LTE, scheduling is expected to be performed based on the sTTI described above. There are a total of two basic sTTI structures.

Slot-based sTTI: 0.5 ms unit (slot unit)
Non-slot-based sTTI: 0.214/0.143 ms unit The non-slot-based sTTI means that an sTTI may be a sub-slot which is a unit smaller than one slot. In the LTE, one slot may be formed of 7 symbols, and thus the sub-slot may be formed of less than 7 symbols.

The symbol described in at least one embodiment denotes an OFDM symbol, and the symbol may be an RS symbol or a data symbol. A data symbol denotes an OFDM symbol storing information.

For example, a non-slot-based sTTI may be configured with two or three symbols, and has a structure of preserving a slot boundary of each subframe.

Maintaining of a slot boundary of each subframe means that no sTTI spans over two different slot areas. That is, the last symbol of slot #0 and the first symbol of slot #1 that constitute one subframe are present to different sTTIs from each other and cannot be present in the same sTTI.

Figure 6:
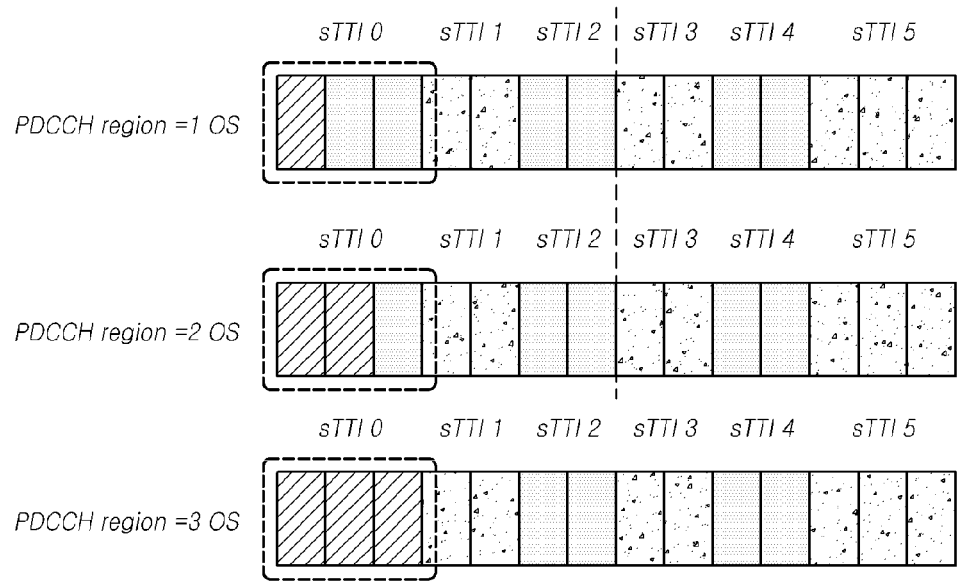
FIG. 6 is a diagram illustrating a non-slot-based sTTI in downlink, according to at least one embodiment of the present disclosure.
Figure 7:
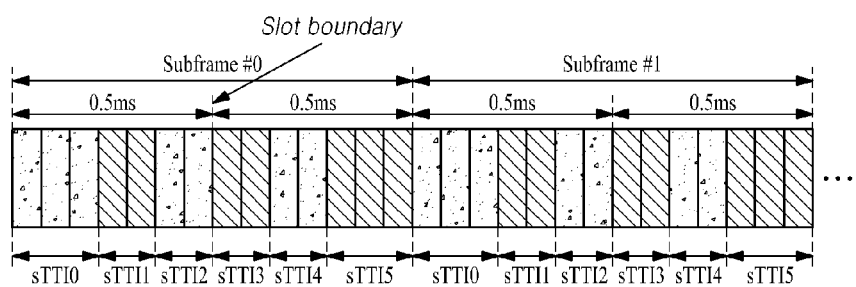
FIG. 7 is a diagram illustrating a non-slot-based sTTI in uplink, according to at least one embodiment of the present disclosure.

For example, a 2-symbol sTTI structure may include an UL sTTI as shown in FIG. 6, and a 2-symbol sTTI structure may include a DL sTTI as shown in FIG. 7. FIG. 6 is a diagram illustrating non-slot-based sTTIs in the DL, and FIG. 7 is a diagram illustrating non-slot-based sTTIs in the UL. As shown in FIG. 6 and FIG. 7, sTTIs are distinguished from a slot boundary, and no sTTI spans the slot boundary.

Basically, a legacy PDCCH is designed based on a BLER performance of $10^{-3}$. In addition, a data channel is operated based on HARQ retransmission based on a BLER of $10^{-1}$. Herein, an enhancement in terms of reliability and latency based on the sTTI frame structure or the sTTI service above described is characteristic of the URLLC for LTE (Ultra-Reliable and Low-Latency Communications for LTE).

Accordingly, although it may be assumed that the latency issue has already been solved using the sTTI, the satisfying of the BLER performance of $10^{-5}$ is still required. Even though its coverage may vary depending on the size of data, multi-slot-based and/or non-slot-based scheduling functions are required to satisfy at least the data channel transmission or reception performance of the BLER of $10^{-5}$.

Basically, since the sTTI structure adopts an UL asynchronous HARQ (HARQ) structure, information on a HARQ process number and/or a redundancy version is included in UL and/or DL DCIs respectively.

However, in the present multi-slot-based and/or non-slot-based scheduling, a setting of redundancy version information setting has not been discussed in detail.

Accordingly, a method of scheduling multi-sTTI-based data channel transmission and/or reception, and a method of setting a redundancy version for repetitive transmission of a data channel and a method of signaling therefor will be described in the following embodiments of the present disclosure.

Some embodiments described below may be used individually or in any combination.

Embodiment 1. Performing Multi-Slot-Based and/or Non-Slot-Based sTTI Scheduling on a Per Single Subframe Basis in URLLC Services.

According to the Embodiment 1, a method may be provided for configuring, as a single subframe, a unit of repetitive transmission for providing URLLC services in the LTE. Basically, two sTTI structures may be applied to the legacy subframe(=1 ms), and the structures are as follows.

Slot-based sTTI: 2 sTTIs within a 1 ms subframe
Non-slot-based sTTI: 6 sTTIs within the 1 ms subframe In order to satisfy the URLLC requirement of the BLER of $10^{-5}$, a UE or a BS performs repetitive transmission of a sTTI at the time of data channel transmission and/or reception, and the repetitive transmission is based on the legacy subframe. Accordingly, the unit of the repetitive transmission may be up to two or six sTTIs in the legacy subframe according to each sTTI structure.

That is, the unit of performing repetitive transmission is the subframe in this embodiment.

In a slot-based sTTI, since only two sTTIs exist in the 1 ms subframe, boundary identifying in a single subframe is unnecessary at the time of repetitive transmission.

However, in a non-slot-based sTTI, six sTTIs may exist in the 1 ms subframe. In this case, assuming that scheduling is consecutively performed for four sTTIs in the non-slot-based sTTI, the corresponding configuration is valid only within a single subframe, and the configuration for the next subframe is required to be received again.

Figure 8:
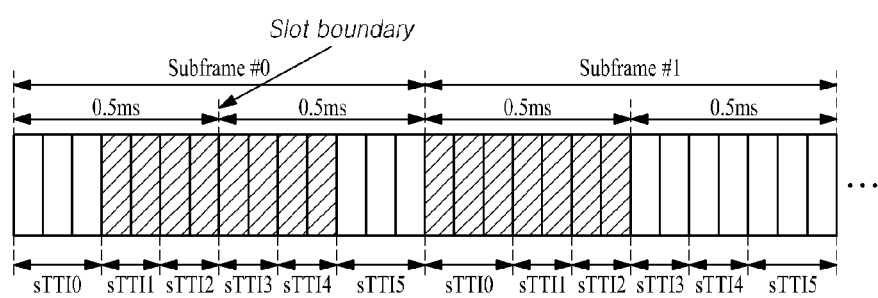
FIG. 8 is a diagram illustrating multi-sTTI scheduling based on a single subframe, according to at least one embodiment of the present disclosure.

For example, as shown in FIG. 8, four sTTIs are configured from sTTI 1 to sTTI 4 in subframe #0, and a total of three sTTIs may be configured from sTTI 0 to sTTI 2 in subframe #1. That is, in configuring a period in which repetitive transmission is performed, it may be seen that a consecutive scheduling period may be effectively configured on a per subframe basis.

As described, multiple sTTIs are configured as a single subframe unit. Such a multiple sTTIs configuration may be repeated during a predetermined subframe period.

Figure 9:
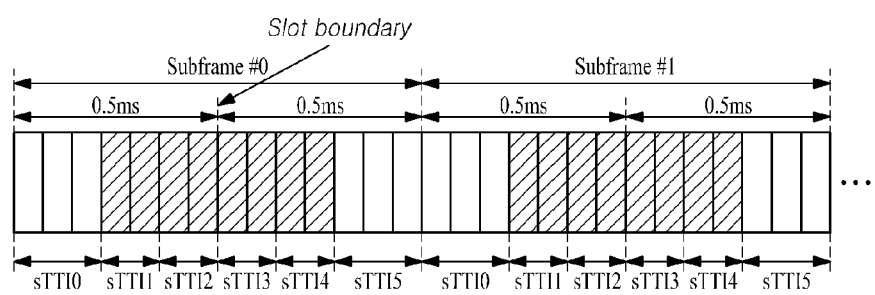
FIG. 9 is a diagram illustrating multi-sTTI scheduling based on multiple subframes, according to at least one embodiment of the present disclosure.

For example, referring to FIG. 9, multiple sTTI scheduling is performed at an identical period from sTTI 1 to sTTI 4 in both of Subframe #0 and Subframe #1. Hereinbefore, the Embodiment 1 has been described based on an sTTI configuration for a repetitive transmission period configuration. The Embodiment 1 may be applied, in the same manner, to a typical multi-sTTI scheduling that allocates general data independently for each sTTI.

Embodiment 1-1. Signaling, to a UE, Configuration Information on an sTTI that Transmits Data in One Subframe.

In non-slot-based sTTI repetitive transmission, repetitive transmission may be performed through a maximum of six sTTIs in a subframe. In this case, it is not necessary to always set all sTTIs within a repetitive transmission period in a subframe for setting a multi-sTTI period for repetitive transmission.

That is, only a period for performing actual data transmission is set as a repetitive transmission period. Basically, it is most preferable to repeat such a transmission period based on a unit of a subframe. However, a BS may configure a multiple subframe period in accordance with situations and signal to a UE an actual transmission period in the multiple subframe period. In this case, such signaling may cause overhead.

In order to set a subframe period for performing multi-sTTI transmission, information such as a start subframe, a period, and the like may be configured through RRC signaling.

The sTTI set information may be information on repetitive transmission of actual data. Embodiments for transmitting such sTTI set information may be divided into the following two embodiments.

Embodiment 1-1-1. Signaling, to a UE, a Start sTTI and Length Information Within One Subframe.

In the Embodiment 1-1-1, when consecutive sTTIs are allocated to a UE, a start position of the sTTIs to be allocated and length information of consecutive sTTIs are transmitted. In an alternative (Alt) to the signaling described below, DCI means dynamic signaling, and RRC means higher layer signaling (also referred to as high layer signaling or semi-static signaling).

In the Embodiment 1-1-1, the start position and the consecutive sTTI transmission period are defined as length information. Accordingly, such length information may include four alternatives according to routes for transmitting the length information.

Alt. 1: start position (DCI), length (RRC)
Alt. 2: start position (RRC), length (DCI)
Alt. 3: start position (DCI), length (DCI)
Alt. 4: start position (RRC), length (RRC)

Figure 10:
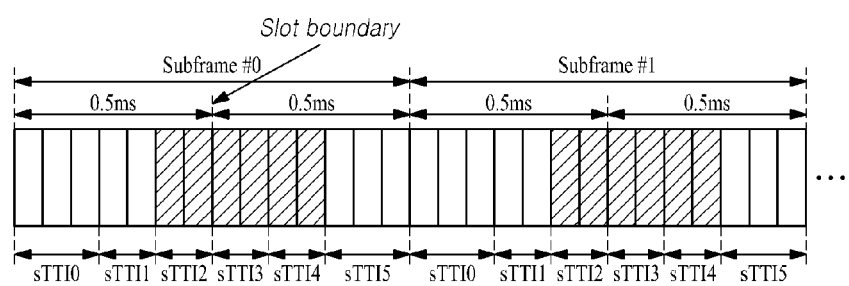
FIG. 10 is a diagram illustrating configuring a non-slot-based sTTI transmission period, according to an embodiment of the present disclosure.

For example, if an index of the start position is sTTI 2 (assuming that it starts from sTTI 0) and the length is 3, a sTTI transmission period may be configured as shown in FIG. 10. That is, since the index of the start sTTI is sTTI 2, sTTI 2, sTTI 3, and sTTI 4 are consecutive transmission periods. In this embodiment, it requires a field of up to 3 bits for indicating the start position and a field of up to 3 bits for indicating the length information.

Embodiment 1-1-2. Signaling, to a UE, Information on a sTTI Set for Transmitting Actual sTTI within One Subframe.

It is also possible to allocate non-consecutive multi-sTTIs as well as consecutive sTTIs to a UE for data transmission. To do this, it requires a 2-bit field in a slot-based sTTI structure and a 6-bit field in a non-slot-based sTTI.

Through this, sTTI information of actual data transmission may be transmitted to a UE in the form of on/off for each sTTI. That is, it is comparatively easy to set a discontinuous sTTI period in the Embodiment 1-1-2, compared to the Embodiment 1-1-1.

Figure 11:
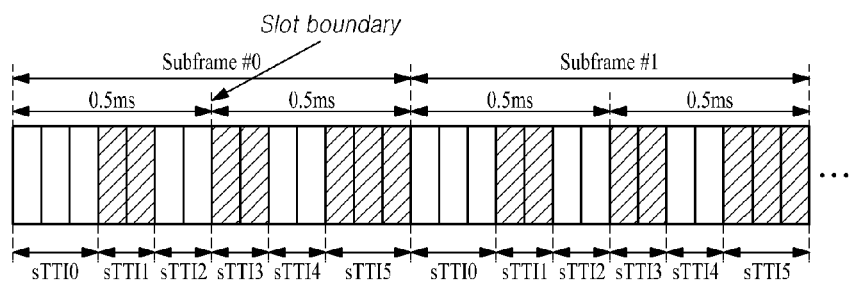
FIG. 11 is a diagram illustrating configuring a non-slot-based sTTI transmission period, according to another embodiment of the present disclosure.

For example, if a sTTI transmission period is configured for sTTI indexes 1, 3 and 5 (assuming that the index starts from 0) as shown in FIG. 11, signaling information is '010101' (up to 6 bits of signaling information may be needed).

Meanwhile, as a method of performing signaling, it is possible to use dynamic signaling of directly adding a corresponding field in the DCI or semi-static signaling for indicating through RRC.

Embodiment 2. Setting a Redundancy Version Application Pattern of Multiple sTTIs Based on a Unit of a Subframe.

The Embodiment 2 will be described assuming that an sTTI period is configured for repeatedly transmitting a sPDSCH. Furthermore, the Embodiment 2 may be applied to configuring the sTTI period based on single frame unit, and the Embodiment 2 may be applied when a UE repeatedly transmits the sPUSCH to a BS as well as the sPDSCH.

Hereinafter, as the Embodiment 2, a method of specifically setting a redundancy version of data of the sPDSCH, which is repeatedly transmitted through multiple sTTIs, will be described.

Here, the redundancy version denotes a transmission position of a block that is encoded based on a unit of a transport block (TB) and/or a code block (CB) and transmitted over the sPDSCH.

Figure 12:
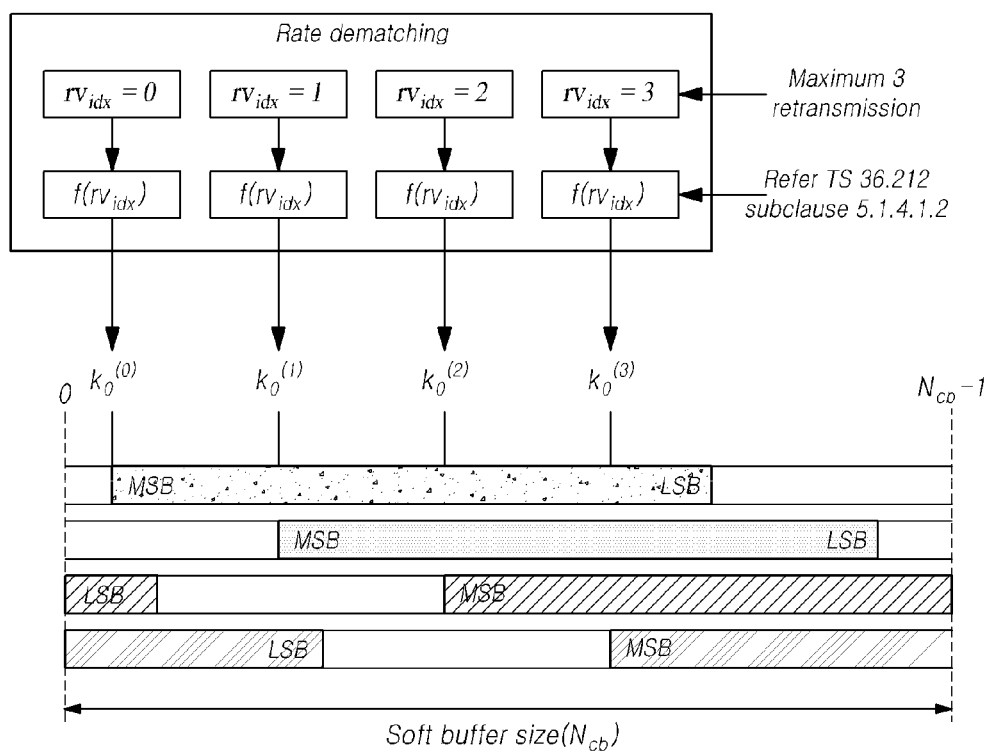
FIG. 12 is a conceptual diagram illustrating the redundancy of a transmission block (TB) and a code block (CB) in the LTE, according to at least one embodiment of the present disclosure.

As shown in FIG. 12, positions for transmitting data are different for each redundancy version. Accordingly, it is important to transmit data by evenly distributing redundancy versions when transmitting data through multiple sTTIs. In the end, a UE or a BS may perform soft value combining for data transmission.

Basically, a redundancy version pattern may be set based on a single subframe period. Hereinafter, a specific value for determining a transmission position of each sTTI is referred to as a redundancy version pattern, and when data are transmitted through one or more sTTIs, a sequence of redundancy versions patterns is referred to as a redundancy version sequence.

Basically, the redundancy version may contain a total of four patterns (Rv=0,1,2,3).

A 1 ms subframe includes only two the slot-based sTTIs. Accordingly, the length of the basic sequence is 2, and there are a total of four redundancy version sequences.

On the other hand, the subframe includes a total of six non-slot-based sTTI. However, since a total of four redundancy version patterns (Rv=0, 1, 2, 3) are provided, the basic sequence length for the redundancy versions is 4.

For example, a method of setting the redundancy version may be determined as follows.

1) Slot-based scheduling: RV (rv0, rv1)={(0,2), (1,3), (2,0), (3,1)}. A total of four sequences exists (selected and set).

2) Non-slot-based scheduling: RV (rv0, rv1, rv2, rv3) may be set as follows.

A. Alt 1: Apply RV (rv0, rv1, rv2, rv3)=(0,2,1,3) based on modulo.
B. Alt 2: Apply RV ($rv_0$, $rv_1$, $rv_2$, $rv_3$)=(0,0,0,0), (1,1,1,1), (2,2,2,2) or (3,3,3,3) based on modulo.
C. Alt 3: Apply a predetermined specific pattern, such as, RV (rv0, rv1, rv2, rv3)=(2,2,1,1), (1,1,3,3), or the like, based on modulo.

In non-slot-based sTTI repetitive transmission, repetitive transmission may be performed through up to six sTTIs within one subframe. The circular modulo 4 scheme may be applied according to each the number of sPDSCH transmissions.

For example, it is assumed that RV (rv0, rv1, rv2, rv3)= (0,2,1,3) and six non-slot-based sTTI repetitive transmissions are performed. At this time, if sPDSCHs/PDSCHs are sequentially transmitted, a redundancy version sequence becomes RV (rv0, rv1, rv2, rv3, rv0, rv1)=(0, 2, 1, 3, 0, 2).

In this case, the redundancy version sequence is formed of six elements, and the first element pattern and the fifth element pattern of the sequence are identically 0, and the second element pattern and the sixth element pattern of the sequence are identically 2.

As another example, it is assumed that RV (rv0, rv1, rv2, rv3)=(0,2,3,1) and six non-slot based sTTI repetitive transmissions are performed, a redundancy version sequence becomes RV (rv0, rv1, rv2, rv3, rv0, rv1)=(0,2,3,1,0,2).

Figure 13:
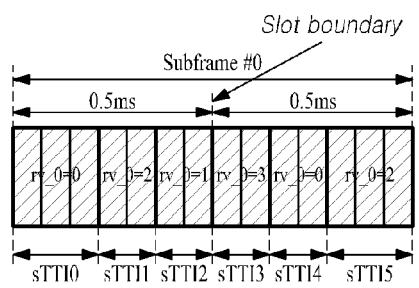
FIG. 13 is a diagram illustrating a method of mapping a redundancy version in a circular form in a non-slot-based sTTI, according to at least one embodiment of the present disclosure.
Figure 14:
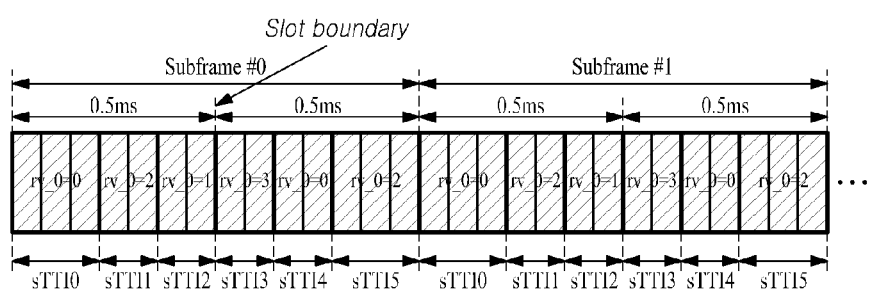
FIG. 14 is a diagram illustrating a method of mapping a redundancy version in a circular form in a non-slot-based sTTI in a period of multiple subframes, according to at least one embodiment of the present disclosure.

FIG. 13 illustrates a redundancy version mapping scheme applied at the time of such sTTI-based data transmission. Meanwhile, in a period of multiple subframes, a redundancy version sequence is repeated as shown in FIG. 14. The redundancy version sequence applied in FIGS. 13 and 14 is RV (rv0, rv1, rv2, rv3, rv0, rv1)=(0,2,1,3,0,2).

Embodiment 2-1. Setting Redundancy Version Application Patterns of Multiple sTTIs Based on a Multiple Subframe.

The Embodiment 2-1 uses the same method as the Embodiment 2, but the Embodiment 2-1 uses a multiple subframe period unit as a period unit for configuring the redundancy version application pattern.

For example, assume that RV (rv0, rv1, rv2, rv3)=(0,2,1, 3) is applied to all sTTI consecutive transmissions.

Figure 15:
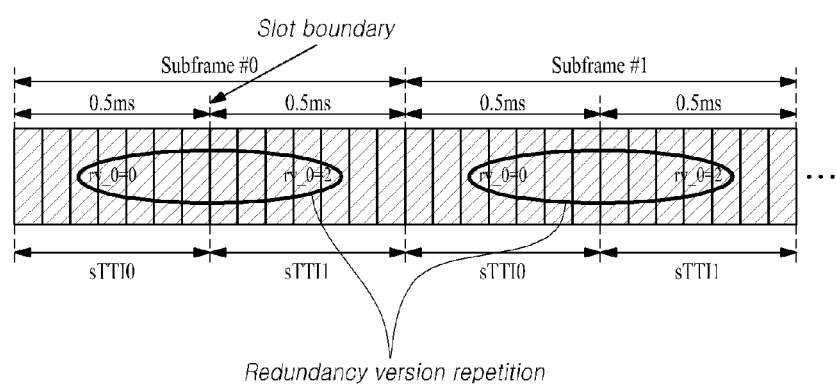
FIG. 15 is a diagram illustrating a method of setting a redundancy version on a per subframe basis in a slot-based sTTI, according to at least one embodiment of the present disclosure.

If, in a slot-based structure, a redundancy version is applied based on a unit of a single subframe, a specific pattern may be repeated for two sTTI transmissions in two consecutive subframe periods as shown in FIG. 15.

Figure 16:
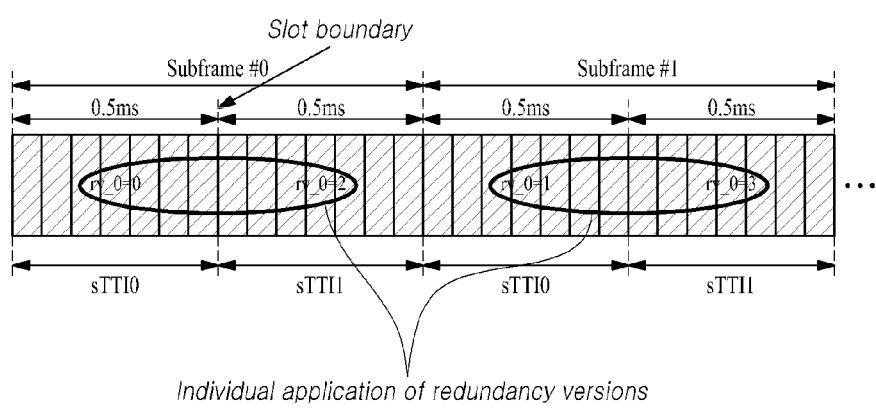
FIG. 16 is a diagram illustrating a method of setting a redundancy version on a per multiple subframe basis in a slot-based sTTI, according to at least one embodiment of the present disclosure.

However, if a redundancy version is applied to the entire period of multiple subframes, a redundancy version may be mapped in a circular form in the entire period of the subframes as shown in FIG. 16.

In the same manner, a redundancy version may be applied in a non-slot based sTTI.

Figure 17:
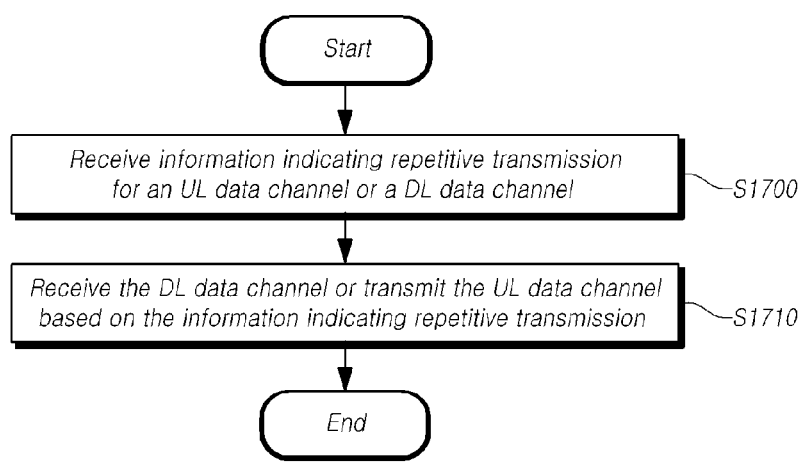
FIG. 17 is a flowchart illustrating a method of transmitting an uplink data channel or receiving a downlink data channel by a UE, according to at least one embodiment of the present disclosure.

FIG. 17 is a flowchart illustrating a method of transmitting an UL data channel or receiving a DL data channel by a UE, according to at least one embodiment of the present disclosure.

Referring to FIG. 17, a UE may receive information indicating repetitive transmission of an UL data channel or a DL data channel from a BS at step S1700.

In this case, the UE may be a URLLC UE supporting the URLLC service described above. The information indicating the repetitive transmission received by the UE from the BS may indicate information on the number of repetitive transmissions for the UL data channel or the DL data channel.

The number of repetitive transmissions indicated by the information indicating the repetitive transmission described above may be determined as one of 1, 2, 3, 4, and 6. For example, the number of repetitive transmissions indicated by the information indicating the repetitive transmission described above may be 3 or 6.

As an example of a method of receiving the information indicating the repetitive transmission by the UE from the BS, the UE may receive the information indicating the repetitive transmission from the BS through DL control information (DCI). When the DCI includes a field indicating the repetitive transmission, the UE may determine the number of repetitive transmissions by checking a value of the corresponding field in the received DCI. A specific example of a DCI configuration will be described later in detail with reference to FIG. 21.

As another example of a method of receiving information indicating the repetitive transmission by the UE from the BS, the UE may receive information indicating the repetitive transmission from the BS through semi-persistent scheduling (SPS) configuration information. In this case, the UE may determine the number of repetitive transmissions based on a SPS periodicity indicated in the SPS configuration information.

At this time, the maximum value of the number of repetitive transmissions that can be indicated by the information indicating the repetitive transmission described above may be 6. The maximum value of the number of repetitive transmissions may be indicated to the UE through separate higher layer signaling (e.g., RRC signaling).

For example, if the UE receives information indicating the repetitive transmission from the BS through the DCI, when a value of the field indicating the repetitive transmission in the DCI indicates the maximum value of the number of repeated transmissions (for example, '11'), information on the maximum value (for example, 4, 6) of the number of specific repetitive transmissions may be separately received from the BS through RRC signaling.

The repetitive transmission may be performed based on a unit of a slot or a unit of a sub-slot. In this case, the sub-slot means that the sTTI may be configured in a smaller period than one slot, as described above, and may be configured with two or three symbols.

In addition, at step S1710, the UE may receive a DL data channel from the BS or transmit an UL data channel to the BS based on the information indicating the repetitive transmission received in the step 1700.

Meanwhile, a redundancy version sequence for repetitive transmission may be determined, as described in Embodiment 2. The number of elements constituting a redundancy version sequence may be determined according to the number of repetitive transmissions.

For example, when the number of repetitive transmissions is 6, the number of elements constituting the redundant version sequence may be 6. In this case, each element may be set to one of the four patterns, and thus patterns between the specific elements may be the same.

If the circular modulo 4 scheme described in Embodiment 2 is applied, the first and fifth element patterns constituting a redundancy version sequence are the same, the second and sixth element patterns constituting the redundancy version sequence are the same.

If the basic sequence information is RV (rv0, rv1, rv2, rv3)={0, 2, 3, 1}, the redundancy version sequence is {0, 2, 3, 1, 0, 2}.

If the basic sequence information is RV (rv0, rv1, rv2, rv3)={0, 0, 0, 0}, the redundancy version sequence is {0, 0, 0, 0, 0, 0}.

If the basic sequence information is RV (rv0, rv1, rv2, rv3)={0, 3, 0, 3}, the redundancy version sequence is {0, 3, 0, 3, 0, 3}.

Figure 18:
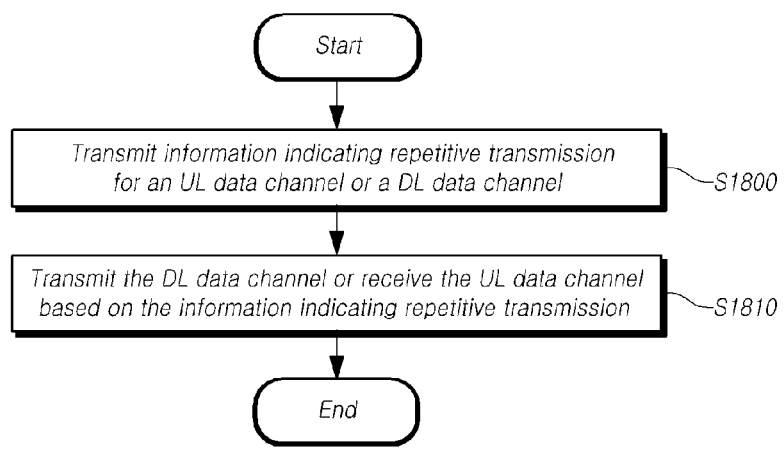
FIG. 18 is a flowchart illustrating a method of receiving an uplink data channel or transmitting a downlink data channel by a base station, according to at least one embodiment of the present disclosure.

FIG. 18 is a flowchart illustrating a method of receiving an UL data channel or transmitting a DL data channel by a base station, according to at least one embodiment of the present disclosure.

Referring to FIG. 18, a BS may transmit information indicating repetitive transmission of an UL data channel or a DL data channel to a UE at step S1800.

In this case, the UE may be a URLLC UE supporting the URLLC service described above. The information indicating the repetitive transmission transmitted by the BS to the UE may indicate information on the number of repetitive transmissions for the UL data channel or the DL data channel.

The number of repetitive transmissions indicated by the information indicating the repetitive transmission described above may be determined to one of 1, 2, 3, 4, and 6. For example, the number of repetitive transmissions indicated by the information indicating the repetitive transmission described above may be 3 or 6.

As an example of a method of transmitting information indicating the repetitive transmission by a BS to a UE, the BS may transmit information for indicating the repetitive transmission to the UE through the DCI. When the DCI includes a field indicating the repetitive transmission, the UE may determine the number of repetitive transmissions by checking a value of the corresponding field in the received DCI.

As another example of a method of transmitting information indicating the repetitive transmission by the BS to the UE, the BS may transmit information indicating the repetitive transmission to the UE through semi-persistent scheduling (SPS) configuration information. In this case, the UE may determine the number of repetitive transmissions based on a SPS periodicity indicated in the SPS configuration information.

At this time, the maximum value of the number of repetitive transmissions that can be indicated by the information indicating the repetitive transmission described above may be 6. The maximum value of the number of repetitive transmissions may be indicated to the UE through separate higher layer signaling (e.g., RRC signaling).

For example, if the BS transmits information indicating the repetitive transmission to the UE through the DCI, when a value of the field indicating the repetitive transmission in the DCI indicates the maximum value of the number of repeated transmissions (for example, '11'), information on the maximum value (for example, 4, 6) of the number of specific repetitive transmissions may be separately transmitted to the UE through RRC signaling.

The repetitive transmission may be performed based on a unit of a slot or a unit of a sub-slot. In this case, the sub-slot means that the sTTI may be configured in a smaller period than one slot, as described above, and may be configured with two or three symbols.

In addition, at step S1810, the BS may transmit a DL data channel to the UE or receive an UL data channel to the BS based on the information indicating the repetitive transmission transmitted in the step 1800.

Meanwhile, a redundancy version sequence for repetitive transmission may be determined, as described in Embodiment 2. The number of elements constituting a redundancy version sequence may be determined according to the number of repetitive transmissions.

For example, when the number of repetitive transmissions is 6, the number of elements constituting the redundant version sequence may be 6. In this case, each element may be set to one of the four patterns, and thus patterns between the specific elements may be the same.

If the circular modulo 4 scheme described in Embodiment 2 is applied, the first and fifth element patterns constituting a redundancy version sequence are the same, the second and sixth element patterns constituting the redundancy version sequence are the same.

If the basic sequence information is RV (rv0, rv1, rv2, rv3)={0, 2, 3, 1}, the redundancy version sequence is {0, 2, 3, 1, 0, 2}.

If the basic sequence information is RV (rv0, rv1, rv2, rv3)={0, 0, 0, 0}, the redundancy version sequence is {0, 0, 0, 0, 0, 0}.

If the basic sequence information is RV (rv0, rv1, rv2, rv3)={0, 3, 0, 3}, the redundancy version sequence is {0, 3, 0, 3, 0, 3}.

Figure 19:
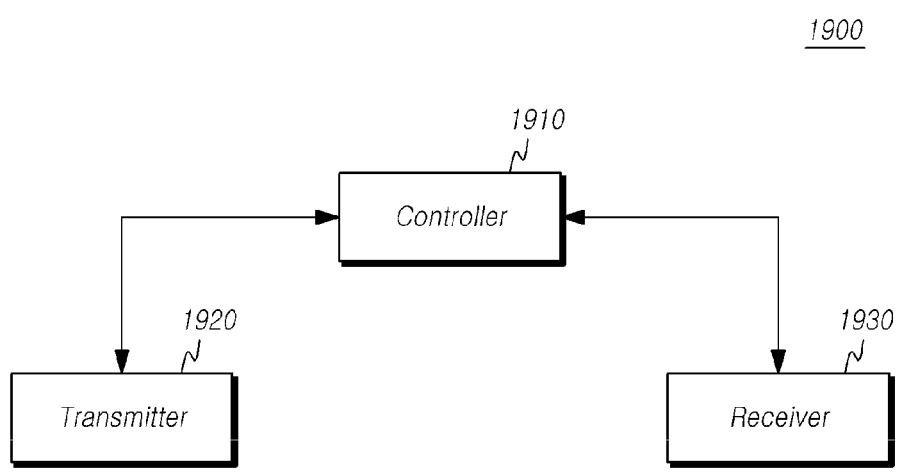
FIG. 19 is a block diagram illustrating a base station, according to at least one embodiment of the present disclosure.

FIG. 19 is a block diagram illustrating a BS, according to at least one embodiment of the present disclosure.

Referring to FIG. 19, a BS 1900 includes a controller 1910, a transmitter 1920, and a receiver 1930.

The controller 1910 may be configured to control overall operations of the BS 1910 for enabling the BS to receive an UL data channel or to transmit a DL data channel.

The transmitter 1920 and the receiver 1930 are configured to transmit and receive signals, messages, and data necessary for carrying out some embodiments as described above, to and from the UE respectively.

Specifically, the transmitter 1920 may be configured to transmit information indicating repetitive transmission of the UL data channel or the DL data channel to the UE and transmits the DL data channel to the UE based on the information indicating the repetitive transmission.

The receiver 1930 may be configured to receive the UL data channel from the UE based on the information indicating the repetitive transmission.

In this case, the UE may be a URLLC UE supporting the URLLC service described above. The information indicating the repetitive transmission transmitted by the BS to the UE may indicate information on the number of repetitive transmissions for the UL data channel or the DL data channel.

The number of repetitive transmissions indicated by the information indicating the repetitive transmission described above may be determined to one of 1, 2, 3, 4, and 6. For example, the number of repetitive transmissions indicated by the information indicating the repetitive transmission described above may be 3 or 6.

As an example of a method of transmitting information indicating the repetitive transmission by a BS to a UE, the BS may transmit information indicating the repetitive transmission to the UE through the DCI. When a field indicating the repetitive transmission exists in the DCI, the UE may determine the number of repetitive transmissions by checking a value of the corresponding field in the received DCI.

As another example of a method of transmitting information indicating the repetitive transmission by the BS to the UE, the BS may transmit information indicating the repetitive transmission to the UE through semi-persistent scheduling (SPS) configuration information. In this case, the UE may determine the number of repetitive transmissions based on a SPS periodicity indicated in the SPS configuration information.

At this time, the maximum value of the number of repetitive transmissions that can be indicated by the information indicating the repetitive transmission described above may be 6. The maximum value of the number of repetitive transmissions may be indicated to the UE through separate higher layer signaling (e.g., RRC signaling).

For example, if the BS transmits information indicating the repetitive transmission to the BS through the DCI, when a value of the field indicating the repetitive transmission in the DCI indicates the maximum value of the number of repeated transmissions (for example, '11'), information on the maximum value (for example, 4, 6) of the number of specific repetitive transmissions may be separately transmitted to the UE through RRC signaling.

The repetitive transmission may be performed based on a unit of a slot or a unit of a sub-slot basis. In this case, the sub-slot means that the sTTI may be configured in a smaller period than one slot, as described above, and may be configured with two or three symbols.

Meanwhile, a redundancy version sequence for repetitive transmission may be determined, as described in Embodiment 2. The number of elements constituting a redundancy version sequence may be determined according to the number of repetitive transmissions.

For example, when the number of repetitive transmissions is 6, the number of elements constituting the redundant version sequence may be 6. In this case, each element may be set to one of the four patterns, and thus patterns between the specific elements may be the same.

If the circular modulo 4 scheme described in Embodiment 2 is applied, the first and fifth element patterns constituting a redundancy version sequence are the same, the second and sixth element patterns constituting the redundancy version sequence are the same.

If the basic sequence information is RV (rv0, rv1, rv2, rv3)={0, 2, 3, 1}, the redundancy version sequence is {0, 2, 3, 1, 0, 2}.

If the basic sequence information is RV (rv0, rv1, rv2, rv3)={0, 0, 0, 0}, the redundancy version sequence is {0, 0, 0, 0, 0, 0}.

If the basic sequence information is RV (rv0, rv1, rv2, rv3)={0, 3, 0, 3}, the redundancy version sequence is {0, 3, 0, 3, 0, 3}.

Figure 20:
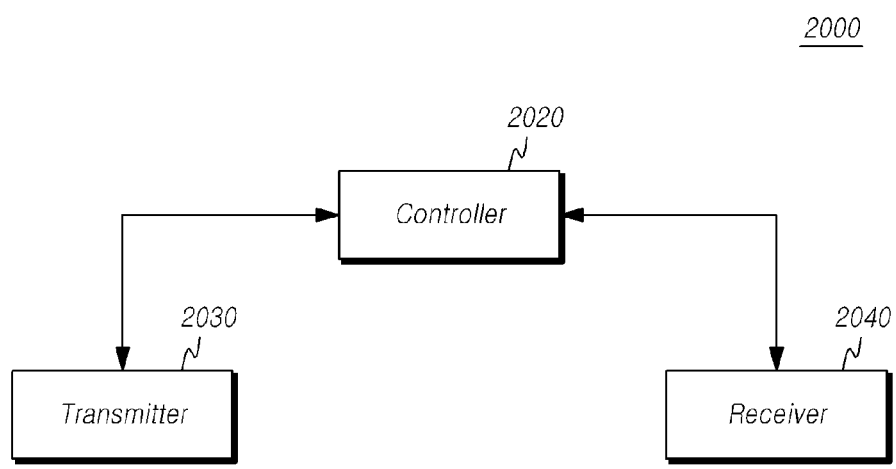
FIG. 20 is a block diagram illustrating a UE, according to at least one embodiment of the present disclosure.

FIG. 20 is a block diagram illustrating a UE, according to at least one embodiment of the present disclosure.

Referring to FIG. 20, a UE 2000 includes a receiver 2010, a controller 2020, and a transmitter 2030.

The receiver 2010 may be configured to receive information indicating repetitive transmission of an UL data channel or a DL data channel from a BS and receive the DL data channel from the BS based on the information indicating the repetitive transmission.

The transmitter 2030 may be configured to transmit the UL data channel to the BS based on the information indicating the repetitive transmission.

In this case, the UE may be a URLLC UE supporting the URLLC service described above. The information indicating the repetitive transmission received by the UE from the BS may indicate information on the number of repetitive transmissions for the UL data channel or the DL data channel.

The number of repetitive transmissions indicated by the information indicating the repetitive transmission described above may be determined to one of 1, 2, 3, 4, and 6. For example, the number of repetitive transmissions indicated by the information indicating the repetitive transmission described above may be 3 or 6.

As an example of a method of receiving the information indicating the repetitive transmission by the UE from the BS, the UE may receive the information indicating the repetitive transmission from the BS through DL control information (DCI). When a field indicating the repetitive transmission exists in the DCI, the UE may determine the number of repetitive transmissions by checking a value of the corresponding field in the received DCI.

As another example of a method of receiving information indicating the repetitive transmission by the UE from the BS, the UE may receive information indicating the repetitive transmission from the BS through semi-persistent scheduling (SPS) configuration information. In this case, the UE may determine the number of repetitive transmissions based on a SPS periodicity indicated in the SPS configuration information.

At this time, the maximum value of the number of repetitive transmissions that can be indicated by the information indicating the repetitive transmission described above may be 6. The maximum value of the number of repetitive transmissions may be indicated to the UE through separate higher layer signaling (e.g., RRC signaling).

In an example, if the UE receives information indicating the repetitive transmission from the BS through the DCI, when a value of the field indicating the repetitive transmission in the DCI indicates the maximum value of the number of repeated transmissions (for example, '11'), information on the maximum value (for example, 4, 6) of the number of specific repetitive transmissions may be separately received from the BS through RRC signaling.

The repetitive transmission may be performed based on a unit of a slot or a unit of a sub-slot. In this case, the sub-slot means that the sTTI may be configured in a smaller period than one slot, as described above, and may be configured with two or three symbols, Meanwhile, a redundancy version sequence for repetitive transmission can be determined, as described in Embodiment 2. The number of elements constituting a redundancy version sequence may be determined according to the number of repetitive transmissions.

For example, when the number of repetitive transmissions is 6, the number of elements constituting the redundant version sequence may be 6. In this case, each element may be set to one of the four patterns, and thus patterns between the specific elements may be the same.

If the circular modulo 4 scheme described in Embodiment 2 is applied, the first and fifth element patterns constituting a redundancy version sequence are the same, the second and sixth element patterns constituting the redundancy version sequence are the same.

If the basic sequence information is RV (rv0, rv1, rv2, rv3)={0, 2, 3, 1}, the redundancy version sequence is {0, 2, 3, 1, 0, 2}.

If the basic sequence information is RV (rv0, rv1, rv2, rv3)={0, 0, 0, 0}, the redundancy version sequence is {0, 0, 0, 0, 0, 0}.

If the basic sequence information is RV (rv0, rv1, rv2, rv3)={0, 3, 0, 3}, the redundancy version sequence is {0, 3, 0, 3, 0, 3}.

FIG. 21 is a diagram illustrating an exemplary structure of DL control information including information indicating repetitive transmission, according to at least one embodiment of the present disclosure.

Referring to FIG. 21, DL control information may include information (e.g., an information field) indicating the number of repetitive transmissions. The information indicating the number of repetitive transmissions indicates how many slots or sub-slots are used in order for the data of the same content to be transmitted repeatedly when a data channel is transmitted.

At this time, since the size of a field indicating the number of repetitive transmissions in DL control information is limited (for example, 2 bits), the number of repetitive transmissions that maybe actually indicated (for example, 5) may be greater than the number of repetitive transmissions that may be indicated by the field indicating the number of repetitive transmissions (for example, four in the case of 2 bits). In this case, a specific value of the number of repetitive transmissions corresponding to the information indicating the number of repetitive transmissions may be indicated through separate higher layer signaling (e.g., RRC signaling).

For example, it is assumed that the size of the field indicating the number of repetitive transmissions is 2 bits and the number of repetitive transmissions that can be actually performed actual is one of 1, 2, 3, 4, and 6. In this case, when the field indicating the number of repetitive transmissions is a predetermined value (for example, '11'), what is the specific value (for example, one of 4 and 6) of the number of repetitive transmissions indicated by the predetermined value may be indicated through separate RRC signaling.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of transmitting an uplink data channel and receiving a downlink data channel by user equipment, the method comprising:
    receiving repetitive transmission information for the uplink data channel or the downlink data channel from a base station; and
    receiving the downlink data channel from the base station or transmitting the uplink data channel to the base station based on the repetitive transmission information,
    wherein the repetitive transmission information indicates information on a number of repetitive transmissions for the uplink data channel or the downlink data channel,
    wherein the repetitive transmission is performed based on a unit of a slot or a unit of a sub-slot,
    wherein a redundancy version sequence for the repetitive transmission is formed of 6 elements, and
    wherein:
        each element of the sequence is set to one of 4 patterns;
        a first element pattern is identical to a fifth element pattern of the sequence;
        a second element pattern is identical to a sixth element pattern of the sequence; and
    wherein the redundancy version sequence for the repetitive transmission is Determined to be one of {0, 2, 3, 1, 0, 2}, {0, 0, 0, 0, 0, 0} and {0, 3, 0, 3, 0, 3};
    wherein the repetitive transmission information is received through Downlink Control Information (DCI),
    wherein the DCI includes a field indicating the number of repetitive transmissions, and
    wherein when a value of the field indicates a maximum value of the number of repeated transmissions, information on the maximum value of the number of repetitive transmissions is received through RRC signaling.

2. The method according to claim 1, wherein the sub-slot is configured with 2 or 3 symbols.

3. The method according to claim 1, wherein the maximum number of repetitive transmissions indicated by the repetitive transmission information is 6.

4. The method according to claim 1, wherein the number of repetitive transmissions is 3 or 6.

5. A method of receiving an uplink data channel and transmitting a downlink data channel by a base station, the method comprising:
    transmitting, to user equipment, repetitive transmission information for the uplink data channel or the downlink data channel; and
    transmitting the downlink data channel to the user equipment or receiving the uplink data channel from the user equipment based on the repetitive transmission information,
    wherein the repetitive transmission information indicates information on a number of repetitive transmissions for the uplink data channel or the downlink data channel,
    wherein the repetitive transmission is performed based on a unit of a slot or a unit of a sub slot,
    wherein a redundancy version sequence for the repetitive transmission is formed of 6 elements, and
    wherein:
        each element of the sequence is set to one of 4 patterns;
        a first element pattern is identical to a fifth element pattern of the sequence;
        a second element pattern is identical to a sixth element pattern of the sequence; and
    wherein the redundancy version sequence for the repetitive transmission is determined to be one of {0, 2, 3, 1, 0, 2}, {0, 0, 0, 0, 0, 0} and {0, 3, 0, 3, 0, 3};
    wherein the repetitive transmission information is transmitted through Downlink Control Information (DCI),
    wherein the DCI includes a field indicating the number of repetitive transmissions, and
    wherein when a value of the field indicates a maximum value of the number of repeated transmissions, information on the maximum value of the number of repetitive transmissions is transmitted through RRC signaling.

6. The method according to claim 5, wherein the sub-slot is configured with 2 or 3 symbols.

7. The method according to claim 5, wherein the maximum number of repetitive transmissions indicated by the information indicating the repetitive transmission is 6.

8. The method according to claim 5, wherein the number of repetitive transmissions is 3 or 6.

9. A user equipment of transmitting an uplink data channel and receiving a downlink data channel, the user equipment comprising:
    a receiver configured to receive repetitive transmission information of the uplink data channel or the downlink data channel from a base station, and receive the downlink data channel from the base station based on the repetitive transmission information; and
    a transmitter configured to transmit the uplink data channel to the base station based on the repetitive transmission information,
    wherein the repetitive transmission information indicates information on a number of repetitive transmissions for the uplink data channel or the downlink data channel,
    wherein the repetitive transmission is performed based on a unit of a slot or a unit of a sub slot,
    wherein a redundancy version sequence for the repetitive transmission is formed of 6 elements, and
    wherein:
        each element of the sequence is set to one of 4 patterns;
        a first element pattern is identical to a fifth element pattern of the sequence;
        a second element pattern is identical to a sixth element pattern of the sequence; and
    wherein the redundancy version sequence for the repetitive transmission is determined to be one of {0, 2, 3, 1, 0, 2}, {0, 0, 0, 0, 0, 0} and {0, 3, 0, 3, 0, 3},
    wherein the repetitive transmission information is received through Downlink Control Information (DCI),
    wherein the DCI includes a field indicating the number of repetitive transmissions, and wherein when a value of the field indicates a maximum value of the number of repeated transmissions, information on the maximum value of the number of repetitive transmissions is received through RRC signaling.

10. The user equipment according to claim 9, wherein the sub-slot is configured with 2 or 3 symbols.

11. The user equipment according to claim 9, wherein the maximum number of repetitive transmissions indicated by the repetitive transmission information is 6.

12. The user equipment according to claim 9, wherein the number of repetitive transmissions is 3 or 6.

* * * * *